US011468116B2

(12) United States Patent
Lee et al.

(10) Patent No.: US 11,468,116 B2
(45) Date of Patent: Oct. 11, 2022

(54) PLACE SEARCH BY AUDIO SIGNALS

(71) Applicant: Google LLC, Mountain View, CA (US)

(72) Inventors: Yongzhong Lee, Tokyo (JP); Alastair Tse, Tokyo (JP); Hsun Tang, Tokyo (JP); Ken Kawamoto, Tokyo (JP); Charles Su, Tokyo (JP); Ricardo Escutia, Tokyo (JP)

(73) Assignee: Google LLC, Mountain View, CA (US)

( * ) Notice: Subject to any disclaimer, the term of this patent is extended or adjusted under 35 U.S.C. 154(b) by 199 days.

(21) Appl. No.: 16/757,206

(22) PCT Filed: Dec. 19, 2019

(86) PCT No.: PCT/US2019/067524
§ 371 (c)(1),
(2) Date: Apr. 17, 2020

(87) PCT Pub. No.: WO2021/126214
PCT Pub. Date: Jun. 24, 2021

(65) Prior Publication Data
US 2021/0191974 A1    Jun. 24, 2021

(51) Int. Cl.
*G06F 16/68* (2019.01)
*G06F 16/687* (2019.01)
*G06F 16/683* (2019.01)

(52) U.S. Cl.
CPC .......... *G06F 16/687* (2019.01); *G06F 16/685* (2019.01); *G06F 16/686* (2019.01)

(58) Field of Classification Search
CPC ..... G06F 16/687; G06F 16/685; G06F 16/686
See application file for complete search history.

(56) References Cited

U.S. PATENT DOCUMENTS

2010/0142715 A1\* 6/2010 Goldstein ............ H04R 1/1083
707/769
2012/0046050 A1\* 2/2012 Hymel .................. H04W 4/029
455/456.3

(Continued)

OTHER PUBLICATIONS

International Search Report and Written Opinion for International Application No. PCT/US2019/067524 dated Jul. 9, 2020. 12 pages.

(Continued)

*Primary Examiner* — Joseph Saunders, Jr.
(74) *Attorney, Agent, or Firm* — Lerner, David, Littenberg, Krumholz & Mentlik, LLP

(57) ABSTRACT

The present disclosure provides systems and methods that provides users with information pertaining to the audio properties at one or more points of interest. A database associated the audio properties with the points of interest is built using audio input received from devices at the points of interest. The device may determine that audio properties associated with the received audio input. The audio properties may determine a type of background noise and/or a volume of the background noise. If the type of background noise is music, the audio properties may further include a music genre, a title of a song, whether the music is recorded or there is a live band, etc. The audio properties associated with the point of interest may be updated in a database real time.

20 Claims, 9 Drawing Sheets

(56) References Cited

U.S. PATENT DOCUMENTS

2014/0067799 A1  3/2014  Zolfo et al.
2017/0235825 A1  8/2017  Gordon

OTHER PUBLICATIONS

International Preliminary Report on Patentability for International Application No. PCT/US2019/067524 dated Jun. 30, 2022. 7 pages.
First Examination Report for Indian Patent Application No. 202027048619 dated Jul. 25, 2022. 8 pages.

* cited by examiner

PLACE SEARCH BY AUDIO SIGNALS

CROSS-REFERENCE TO RELATED APPLICATION

This application is a national phase entry under 35 U.S.C. § 371 of International Application No. PCT/US2019/067524, filed Dec. 19, 2019, the entire disclosure of which is incorporated herein by reference.

BACKGROUND

Many devices, including smartphones and smartwatches, provide for geographic location searching and for querying points of interest. For example, a user may provide a geographical location as part of a search query for points of interest in or around that geographic location. The user may further include, as part of their search query, a type of point of interest they are searching for, such as a restaurant, an activity, center, a concert venue, movie theater, etc. For example, the user may search for "coffee shops in Springfield." Information regarding points of interest matching the search query to some degree are provided to the user in response to the search query.

BRIEF SUMMARY

One aspect of the disclosure provides for a device for updating information regarding points of interest with determined audio properties. For example, the device may have one or more memories and one or more processors in communication with the one or more memories. The one or more processors may be configured to receive, from one or more microphones of a client device, audio input. The one or more processors may be further configured to determine one or more audio properties based on the received input, receiving location information associated with the audio input, associate the determined audio properties with a particular point of interest based on the received location information, and update information regarding the particular point of interest stored in the one or more memories with the determined one or more audio properties.

The one or more processors may be further configured to receive a search query, identify one or more selected points of interest in response to the search query, and provide for output at least one of the selected points of interest along with the determined audio properties. The search request may specify at least one of the one or more audio properties. The one or more audio properties may include at least one of a music genre, a title of a currently plating song, or a volume level. The volume level may indicate a music playback volume or a background noise volume. The information regarding the particular point of interest may be updated in real time. The audio pint may be received from the one or more microphones without a prompt from a user. The information regarding the particular point of interest may be part of a mapping database.

Another aspect of the disclosure provides for a method for updating information regarding points of interest with determined audio properties. The method includes receiving, using one or more processors, audio input. The method includes determining, by the one or more processors based on the received audio input, one or more audio properties, receiving, by the one or more processors, location information associated with the audio input, associating, by the one or more processors based on the received location information, the determined audio properties with a particular point of interest, and updating, by the one or more processors, information regarding the particular point of interest with the determined one or more audio properties.

Yet another aspect of the disclosure provides for a non-transitory computer-readable medium storing instructions executable by a processor for performing a method comprising receiving, from one or more microphones, audio input, determining, by one or more processors based on the received audio input, one or more audio properties, receiving, by the one or more processors, location information associated with the audio input, associating, by the one or more processors based on the received location information, the determined audio properties with a particular point of interest, and updating, by the one or more processors, information regarding the particular point of interest with the determined one or more audio properties.

Another aspect of the disclosure provides for a system comprising one or more memories storing a plurality of points of interest in association with one or more audio properties and one or more processors in communication with the one or more memories. The one or more processors may be configured to receive, from at least one client computing device, a search query for one or more points of interest. The search query may include one or more audio properties associated with the one or more points of interest. The one or more processors may be configured to identify, in response to the search query, one or more selected points of interest stored in the one or more memories. The audio properties associated with the one or more selected points of interest may correspond with the one or more audio properties included in the search query. The one or more processors may be configured to provide for output at least one of the selected points of interest along with the corresponding one or more audio properties.

Yet another aspect of the disclosure provides for a method for providing output at least one point of interest along with corresponding audio properties. The method may include receiving, from at least one client computing device, a search query for one or more points of interest. The search query may include one or more audio properties associated with the points of interest. The method may include identifying, in response to the search query, one or more selected points of interest. The audio properties associated with the one or more selected points of interest may correspond with the one or more audio properties included in the search query. The method may include providing for output at least one of the selected points of interest along with the corresponding one or more audio properties.

Another aspect of the disclosure provides for a non-transitory computer-readable medium storing instructions executable by a processor for performing a method comprising receiving, from at least one client computing device, a search query for one or more points of interest. The search query may include one or more audio properties associated with the one or more points of interest. The method may include identifying, by one or more processors in response to the search query, one or more selected points of interest. The audio properties associated with the one or more selected points of interest may correspond with the one or more audio properties included in the search query. The method may include providing, by the one or more processors, for output at least one of the selected points of interest along with the corresponding one or more audio properties.

DETAILED DESCRIPTION

The present disclosure relates to a system that provides users with information pertaining to the audio properties at one or more points of interest. A database associating the audio properties with the points of interest is built using audio input received from devices at the point of interest. For example, such devices include one or more microphones that detect background noise, such as people talking, music playing in the background, etc. A type of the background noise and/or a volume level of the background noise may be determined from the audio input, and such information may be associated with further information, such as address, operating hours, etc., regarding the point of interest in the database. For example, the particular point of interest may be part of a mapping database. In some examples, the audio properties may be updated in the mapping database in real time. Accordingly, search queries from user devices may identify one or more points of interests based on the audio properties. For example, a user may submit a search query for a quiet café or a bar that plays country music and receive relevant results.

The audio properties may include, for example, the type of background noise, volume level, or other characteristics of the received audio. The type of background noise may classify the noise as music, talking, traffic, construction, or any of a variety of other types of noise. According to some examples, where the noise is music, the audio properties may further specify a music genre, a title of a song, whether the music is recorded or there is a live band, etc.

Figure 1:
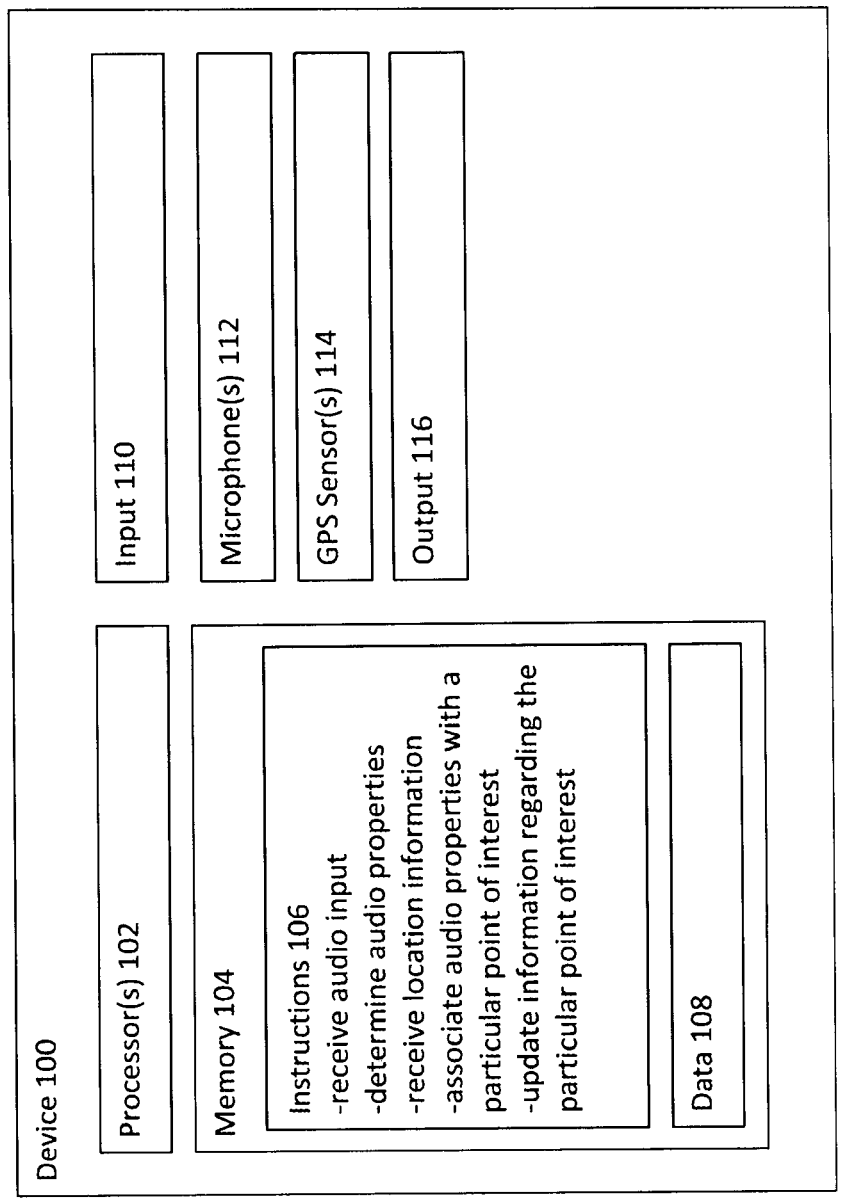
FIG. 1 is a block diagram illustrating an example device according to aspects of the disclosure.

FIG. 1 provides an example block diagram illustrating components of the device. As shown, the device 100 includes various components, such as one or more processors 102, memory 104, and other components typically present in microprocessors, general purpose computers, or the like. Device 100 also includes input 110, microphones 112, and a location determiner such as a global positioning system ("GPS") sensor 114.

The one or more processors 102 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of device 100 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of device 100. Accordingly, references to a processor or computing device will be understood to include references to a collection of processors or computing devices or memories that may or may not operate in parallel.

Memory 104 may store information that is accessible by the processors 102, including instructions 106 that may be executed by the processors 102, and data 108. The memory 104 may be of a type of memory operative to store information accessible by the processors 102, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 106 and data 108 are stored on different types of media.

Data 108 may be retrieved, stored or modified by processors 102 in accordance with the instructions 106. For instance, although the present disclosure is not limited by a particular data structure, the data 108 may be stored in computer registers, in a relational database as a table having a plurality of different fields and records, XML documents, or flat files. The data 108 may also be formatted in a computer-readable format such as, but not limited to, binary values, ASCII or Unicode. By further way of example only, the data 108 may be stored as bitmaps comprised of pixels that are stored in compressed or uncompressed, or various image formats (e.g., JPEG), vector-based formats (e.g., SVG) or computer instructions for drawing graphics. Moreover, the data 108 may comprise information sufficient to identify the relevant information, such as numbers, descriptive text, proprietary codes, pointers, references to data stored in other memories (including other network locations) or information that is used by a function to calculate the relevant data.

The instructions 106 can be any set of instructions to be executed directly, such as machine code, or indirectly, such as scripts, by the processor 102. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The device 100 may further include an input 110. The input 110 may be, for example, a touch sensor, dial, button, or other control for receiving a manual command. The input 110 may, in some examples, be a microphone. The device 100 may also include an output 116. The output 116 may be, for example, a speaker.

Device 100 may include at least one microphone 112. The microphones 112 may be able to receive audio input. The audio input may include background noise. Audio properties of the background noise may be determined. The audio properties may include, for example, the type of background noise, such as whether the background noise is music, people talking, street noise such as traffic or construction, etc. When the background noise is music, the audio properties may further determine the genre, title of the song, the artist, etc.

Device 100 may further include at least one GPS sensor 114. The GPS sensors 114 may provide a rough indication as to the location of the device. The determined audio properties may be used to refine the location indicated by the GPS sensors or vice versa.

It should be understood that the device 100 may include other components which are not shown, such as a battery, charging input for the battery, signal processing components, etc. Such components may also be utilized in execution of the instructions 106.

Figure 2:
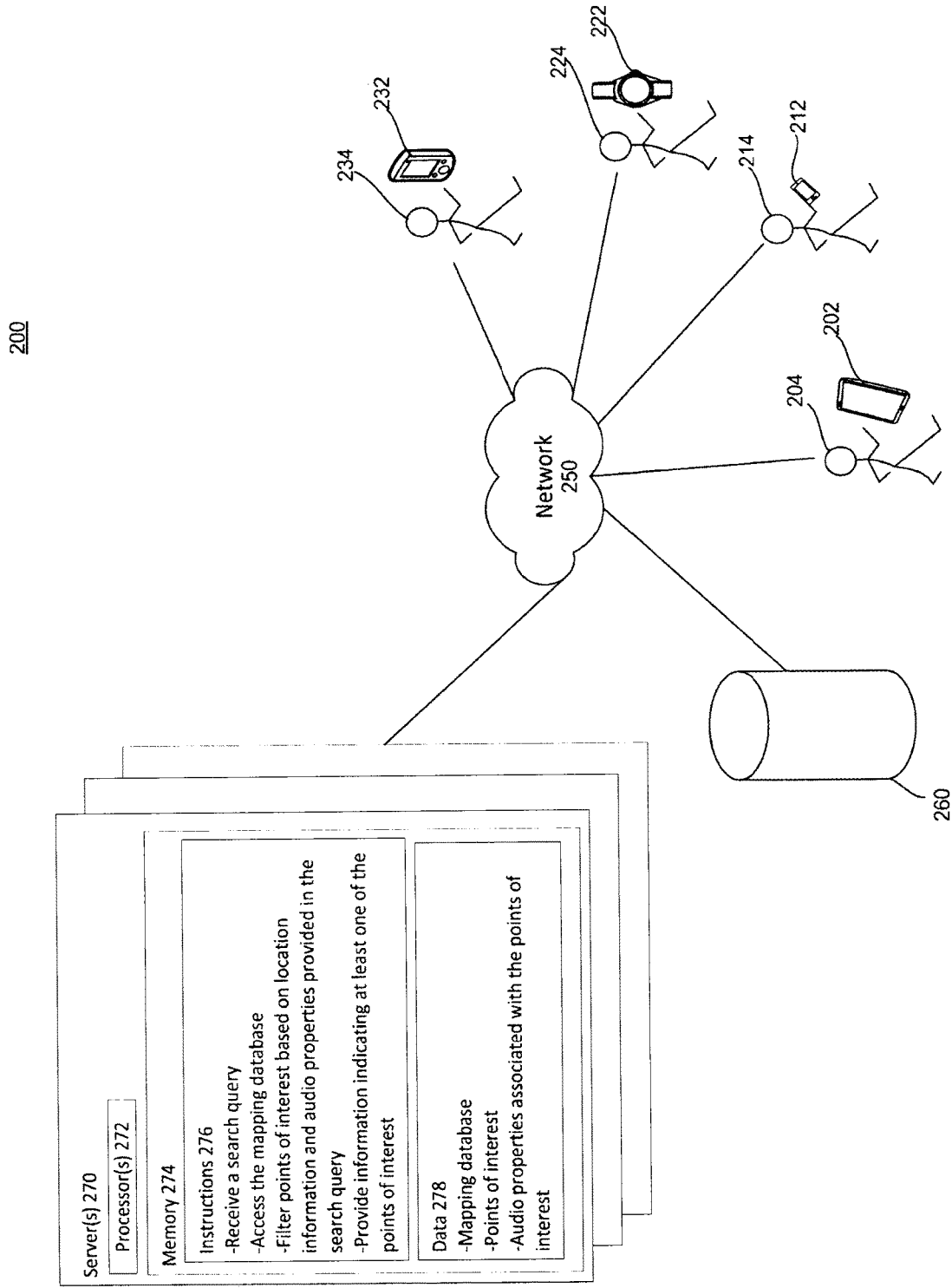
FIG. 2 is a functional diagram of an example system according to aspects of the disclosure.

FIG. 2 illustrates an example system 200 in which the features described herein may be implemented. It should not be considered limiting the scope of the disclosure or usefulness of the features described herein. In this example, system 200 may include a plurality of devices 202, 212, 222, 232, users 204, 214, 224, 234, server computing device 270, storage system 260, and network 250. For purposes of ease, the collection of devices 202, 212, 222, 232 or a single device will be referenced as device(s) 202. Further, also for purposes of ease, the group of users 204, 214, 224, 234 and a single user will be referenced as user(s) 204.

Each device 202 may be a personal computing device intended for use by a respective user 204 and have all of the components normally used in connection with a personal computing device, as described above with relationship to device 100, including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, or touchscreen). The devices may also include one or more microphones. The microphone may receive audio input. For example, the microphone may receive a verbal command from the user. In some examples, the microphone may receive audio input at one or more points of interest. The audio input may include background noise, such as the lull of conversations in the background, music, construction, traffic, etc. The devices 202 may also include a camera, speakers, a network interface device, and all of the components used for connecting these elements to one another. The devices 202 may further include the image sensors. The image sensors may capture features and/or object of a plurality of points of interest. Device 202 may be capable of wirelessly exchanging and/or obtaining data over the network 250.

Although the devices 202 may each comprise mobile computing devices capable of wirelessly exchanging data with a server over a network such as the Internet, they may alternatively comprise a full-sized personal computing device. By way of example only, devices may be mobile phones or devices such as a wireless-enabled PDA, a tablet PC, a wearable computing device (e.g., a smartwatch, headset, smartglasses, virtual reality player, other head-mounted display, etc.), or a netbook that is capable of obtaining information via the Internet or other networks.

The devices 202 may be at various nodes of a network 250 and capable of directly and indirectly communicating with other nodes of network 250. Although four (4) devices are depicted in FIG. 2, it should be appreciated that a typical system 200 can include one or more devices, with each computing device being at a different node of network 250. The network 250 and intervening nodes described herein can be interconnected using various protocols and systems, such that the network can be part of the Internet, World Wide Web, specific intranets, wide area networks, or local networks. The network 250 can utilize standard communications protocols, such as WiFi, that are proprietary to one or more companies. Although certain advantages are obtained when information is transmitted or received as noted above, other aspects of the subject matter described herein are not limited to any particular manner of transmission.

In one example, system 200 may include one or more server computing devices having a plurality of computing devices, e.g., a load balanced server farm, that exchanges information with different nodes of a network for the purpose of receiving, processing and transmitting the data to and from other computing devices. For instance, one or more server computing devices 270 may be a web server that is capable of communicating with the one or more devices 202 via the network 250. In addition, server computing device 270 may use network 250 to transmit and present information to a user 204 of one of the other devices 202. Server computing device 270 may include one or more processors 272, memory 274, instructions 276, and data 278. These components operate in the same or similar fashion as those described above with respect to device 100.

Storage system 260 may store various types of information. For instance, the storage system 260 may store information about points of interest, such as publically accessible ratings, map data, etc. The storage system 260 may store map data. The map data may include, for instance, locations of points of interest. According to some examples, the map data may include audio properties associated with locations of points of interest. This information may be retrieved or otherwise accessed by a service computing device, such as one or more server computing devices 270, in order to perform some or all of the features described herein.

Figure 3:
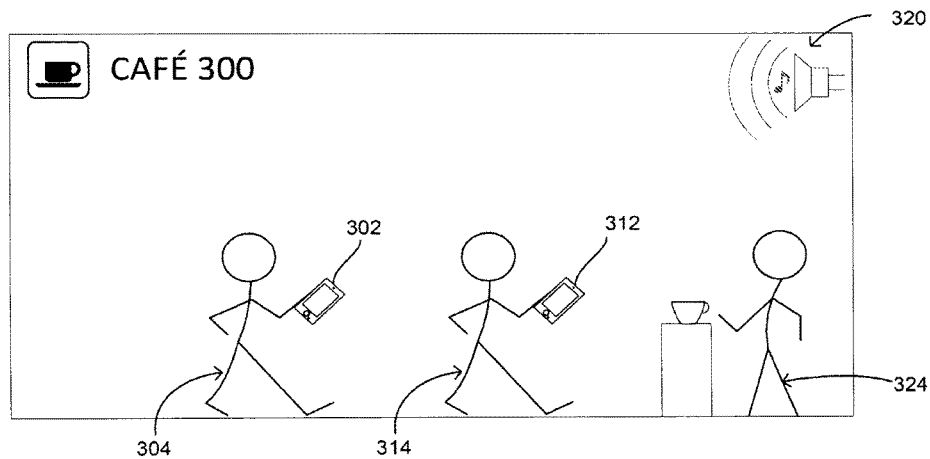
FIG. 3 is a pictorial diagram illustrating an example use of the device according to aspects of the disclosure.

FIG. 3 illustrates an example where a plurality of users 304, 314 are at a particular point of interest. The point of interest may be a restaurant, activity center, concert venue, retail store, landmark, museum, etc. Each user's device 302, 312 may detect audio properties of the point of interest if the user has enabled this function. The device may be configured to only receive background noise as audio input when authorized by the user. For example, the user may enable or disable a background noise detection feature. The user may further adjust the settings on the device to restrict when background noise may be received as audio input. For example, background noise detection may be limited to certain public locations or other conditions, such as when a particular application is in use, a predetermined number of other device users are within range, a particular type of reader or scanner is detected, etc.

As shown in FIG. 3, the users 304, 314, 324 may be within cafè 300. The devices 302, 312 may be similar to device 100 described above. For purposes of ease, devices 302, 312 may be collectively referred to herein as device 302.

There may be background noise, including music 320, within cafè 300. While music 320 is shown as being played through a speaker, music 320 may include a DJ, live music, radio, etc. The background noise may also include people talking, outside noise such as traffic and construction, or any variety of other noises.

The device 302 may detect the background noise, such as through the microphone, and determine a volume level of the background noise. For example, the device 302 may determine whether the background noise volume exceeds a predetermined threshold to be considered loud. The device 302 may include a plurality of predetermined thresholds or intervals to determine whether the background noise volume is loud, conversational, quiet, etc. For example, if the background noise volume is below 50 dB, the background noise volume may be determined to be quiet. If the background noise volume is between 50-70 decibels (dB), the background noise volume may be determined to be conversational or allow for conversation. If the background noise volume is between 70-90 dB, the background noise volume may be determined to be noisy, such a heavy traffic or a noisy restaurant. If the background noise volume level is above 90 dB, the background noise volume may be determined to be loud, such as a live sporting event or music. The ranges described herein are merely examples. The volume ranges for what constitutes noisy, conversational, or quiet may change as the device 302 receives verification or feedback from users about the noise levels. For example, the device 302 may ask verification questions pertaining to the received audio input. The verification questions may ask whether the background noise volume level is loud. If the user answers yes, the device may determine the background noise volume level, in decibels, and use that volume level to create or update the ranges. Moreover, the classifications provided herein are merely exemplary and may have different labels and may change based on the feedback from users.

The device 302 may determine the type of background noise based on the audio input. For example, the device 302 may determine whether the received audio input is the background chatter of people talking, music playing, street noise, etc. The device 302 may determine that the received audio input is a combination of music 320, background chatter, street noise, etc. According to some examples, the device 302 may determine additional audio properties for each of the determined types of background noise. The additional audio properties may include, for example, a volume level, pitch, tone, frequency, intensity, direction, etc. If the device determines that the received audio is music, the device may determine a genre, artist, song title, etc.

In examples where the background noise is the lull of people chattering, the device may determine a volume level associated with the background chatter. In some examples where the background noise is the lull of people chattering, the device 302 may determine a pitch, tone, etc. associated with the chatter. A user may disable receiving background noise as audio input at any time. Similar to determining whether the background noise volume is loud, the device 302 may determine whether the volume of the chatter exceeds a predetermined threshold to be considered loud. The device 302 may include a plurality of predetermined thresholds or intervals to determine whether the volume of the chatter is loud, average, quiet, etc. A quiet chatter volume may indicate that meetings or other conversations can easily occur. In some examples, the device 302 may determine whether people are talking loudly over other background noise, such as over music 320.

In examples where the background noise is music playing, such as music 320, the device may determine additional audio properties, such as a volume level, genre, title of the song, etc. For example, the device 302 may determine a volume level associated with the music 320. Similar to determining whether the background noise volume is loud, the device 302 may determine whether the music volume exceeds a predetermined threshold to be considered loud. The device 302 may include a plurality of predetermined thresholds or intervals to determine whether the music volume is loud, average, quiet, etc. According to some examples, the device 302 may determine other audio properties for music 320. The device 302 may determine a music genre, a title of the song playing, whether the music is recorded or whether there music 320 is a live band, etc.

The audio properties may further be associated with timestamps. In this regard, a particular point of interest may be associated with multiple different audio properties at different points in time. For example, while a coffee shop may be a quiet place for working during the day, it may also be a lively spot with loud folk music in the evening.

Location information may be received and associated with the audio input. For example, the GPS sensors may provide an indication as to the location of the device 302. The GPS data that provides the indication of the location of the device 302 may be used to determine a point of interest associated with that location. In some examples, information from the sensors and/or from interactions with devices such as wireless base stations or wireless access points, RFID readers, etc., can be employed by the position determination module to calculate or otherwise estimate the physical location of device 302. Other examples of location determination systems may determine location based on images of geographic objects such as landmarks, semantic indicators such as light or noise level, etc. While these are a few examples, it should be understood that any of a variety of location determination techniques may be used.

Location information is only provided when authorized by the user, such as when the device is configured to allow for sharing of location information. The user may enable or disable providing location, and may limit the recipients of such information and/or the applications or use of the location information. Moreover, the location data excludes any personal information. According to some examples, a user may adjust settings on the device to enable providing location information when the device is in particular geographical areas, at certain times, or conditions, such as when the device is within Bluetooth range of a predetermined number of other user devices. The user may set the device to automatically disable providing location information in particular locations, such as familiar locations.

The audio input may be received by the device, such that the device may determine the one or more audio properties. The one or more determined audio properties may be received at the servers. According to some examples, the audio input may be received at the servers from a number of devices which have authorized sharing of detected background noise information. The user can enable or disable receiving background noise as audio input, and the device may only receive background noise as audio input if the user has enabled this feature. According to some examples, a user may adjust settings on the device to restrict sharing to particular geographical areas, particular audio properties or a subset of audio properties, times, or conditions, such as when the device is within Bluetooth range of a predetermined number of other user devices. Moreover, the user may set the one or more microphones to automatically disable in particular locations. According to some examples, the user may set the device to automatically disable receiving background noise as audio input in particular locations, such as familiar locations. The user may further configure the device to receive audio input without further active input from the user.

The device may ask the user to verify or provide feedback regarding the received audio input. For example, the device may ask a series of verification questions regarding the location information, volume levels, type of background noise, etc. In examples where the background noise includes music, the verification questions may be about the genre, artist, song title, etc. of the music playing. The questions are used to verify the audio properties associated with the point of interest before updating the audio properties associated with the point of interest.

Figures 4A, 4B, 4C:
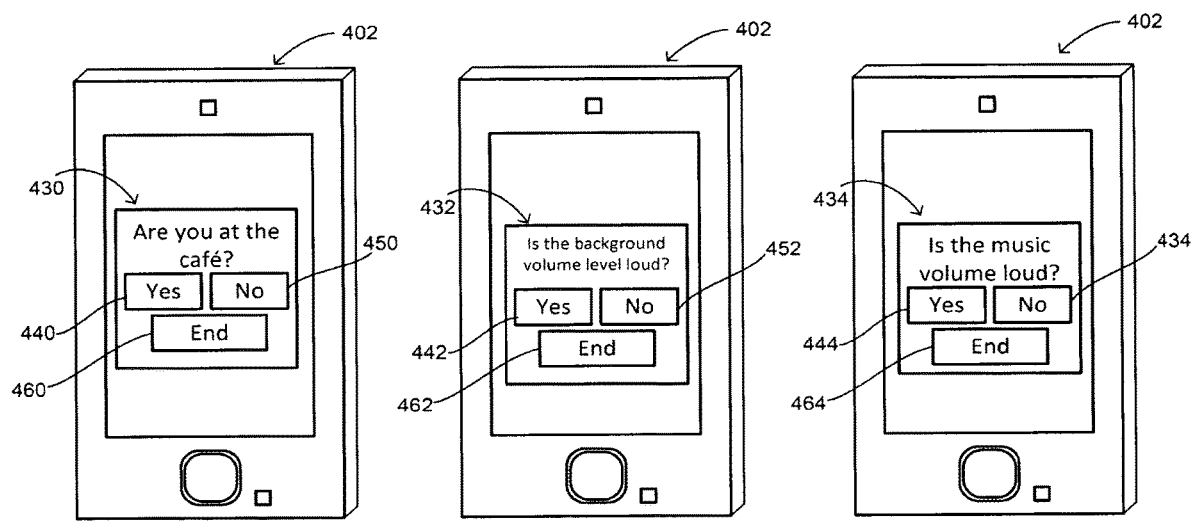
FIGS. 4A-4C are a series of example interfaces corresponding to the example use of FIG. 3.

FIGS. 4A-4C illustrate examples where the user may be asked to verify the audio properties of the audio input received by the device. For example, the device may display a series of prompts or questions to the user. The questions may ask the user to verify the location, the music genre, whether the environment is noisy or quiet, whether there is a live music or a DJ, whether the background noise is loud, whether the music is loud, etc. The device may determine, based on the user's engagement with the prompts, whether to ask more questions. In some examples, the device may look to a user's past cooperation and/or participation with providing feedback for other applications to determine whether to ask a series of questions verifying the audio properties.

As shown in FIG. 4A, device 402 may display a first question 430 seeking feedback. The first question may ask to verify the point of interest. For example, question 430 asks the user to confirm whether the point of interest is a café. The user may answer yes 440 or no 450. This may verify the location information to be associated with the audio input. In some examples, there may be an option to "end" 460. The user may select end 460 if the user does not want to answer any verification questions.

FIG. 4B illustrates a second question. The second question 432 may be asked based on receiving a response to the first question 430. The second question 432 may ask about the overall background volume level. The background volume level may include street noise, chatter, music, etc. The user may answer question 432 with a yes 442, no 452, or end 462. In some examples, the answer may be a ranking scale that the user can provide a rank between 1-10, with 1 being the quietest and 10 being the loudest. In some examples, the scale may be between 1-5. The scale may be a sliding scale, such that the user does not have to select one number but, instead, slides a marker along a scale to indicate the background volume level. The user may select end 462 if the user does not want to answer additional verification questions FIG. 4C illustrates a third question that may be based on the second question 432. The second question 432 may ask about the background noise volume level. The background noise may include music. In some examples, based on the answer to question 432, the third question 434 may ask whether the music volume is loud. The user may select yes 444, no 454, or end 464. In some examples, the user may answer based on a ranking scale or a sliding scale to denote whether the music is loud or not. If the user selects end 464 no further questions will be asked.

Based on the answers provided by the user in response to the verification questions, the audio properties of the point of interest may be updated in real time. For example, information regarding the particular point of interest may include indications pertaining to the type of background noise in real-time. If the type of background noise is music, the information regarding the particular point of interest may include indication of the music genre, the title of a song playing at the time audio input is received, artist, volume level of the music, etc. As one example, the information regarding a particular point of interest may indicate that classic rock is playing at a moderate volume level at the time the audio input is received.

In some examples, real-time audio properties may be compared to historical audio properties, or historical and real-time audio properties may be combined in a statistical model to produce a better estimate. For example, an evaluation period such as a week, a month, etc. may be used. The real-time audio properties may be provided for display in relation to the historical data for the given point of interest.

Figure 5:
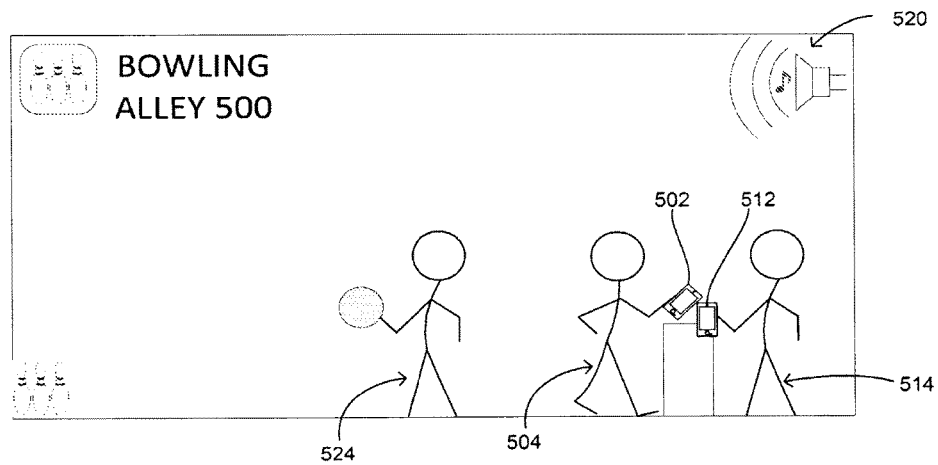
FIG. 5 is a pictorial diagram illustrating another example use of the device according to aspects of the disclosure.

FIG. 5 illustrates another example where a plurality of users are in a particular point of interest and their respective devices may be detecting audio properties of the background noise. For example, users 304, 314, 324 may be within a bowling alley 500. Users 504, 514, 524 may each have a device 502, 512, respectively. Devices 502, 512 may be similar to device 100 described herein. For purposes of ease, device 502, 512 will be collectively referred to herein as device(s) 502.

Within the bowling alley 500, there may be background noise. The background noise may include the sound of voices, the lull of conversations, or chatter, the sound of the bowling ball hitting the pins, music 520, etc. Music 520 may be live music, a DJ, radio (i.e. different music tracks mixed together so that there is no gap between them), music from a jukebox, etc.

Devices 502 may receive the background noise, including music 520, as audio input. The device 502 may determine a type or types of background noise. For example, the device may determine that there are conversations happening, music is playing, and there is some noise associated with the activity in the particular point of interest. In bowling alley 500, the noise associated with the activity may be the sound of the bowling ball hitting the pins. According to some examples, the device 502 may determine additional audio properties for each of the determined types of background noise. The additional audio properties may include an overall background noise volume level, a volume level for chatter, a volume level for music, a genre of music, etc.

In examples where the device 502 determines that the background noise includes the sound of voices or chatter at the particular point of interest, the device 502 may determine a volume level associated with the chatter. According to some examples, the device 502 may determine that people in the bowling alley 500 are talking loudly. People in the bowling alley may have to talk loudly to be heard over the music 520 and/or the sound of the ball hitting the pins. For example, on a weekend night, such as Friday or Saturday night, a live band may playing at the bowling alley 500 with the volume on the speakers turned all the way up. The music 520 may be very loud causing people to have to talk very loud to be heard over music 520. In some examples, the device 502 may determine other audio properties associated with the chatter. For example, the device 502 may determine a pitch, tone, frequency, etc. associated with the chatter.

During some periods of time, the device 502 may determine that people in the bowling alley 500 are talking quietly. In such an example, the device 502 may determine that the other types of background noise, such as music 520, are also quiet. For example, during the day on a weekday, the music 520 may be a radio station playing in the background as the bowling alley 500 may not be as busy.

In examples where the background noise includes music 520, the device may determine a volume level associated with the music 520. For example, the device 502 may classify the volume level of the music as loud, average, or quiet, etc. Loud music may be music 520 that is played at a volume level above 100 dB. Average music may be music 520 that is played at a volume level between 60 dB to 100 dB. Quiet music may be music 520 that is played at a volume level below 60 dB. These ranges are merely examples and may depend on the particular point of interest. For example, if a user is at a concert, a loud volume level may be music that is played at a volume level above 120 dB and a quiet volume level may be music that is played at a volume level below 80 dB. Thus, the ranges and labels are merely examples and may change or be called different things.

According to some examples where the background noise includes music 520, the device 502 may determine a music genre, a title of the song playing, the name of the artist, whether the music 520 is live, on the radio, or being played by a DJ, etc. The determined audio properties associated with the point of interest may be shared with or sent to a server to update information pertaining to the particular point of interest. For example, if the device determines that the bowling alley is playing pop music by a particular artist, those audio properties may be used to update the audio properties associated with the bowling alley in real time.

The audio properties may be associated with a time stamp and particular place of interest. For example, as the device 502 determines the audio properties, the audio properties may be associated with the time they were collected and where they were collected. Audio properties associated with the background noise in the bowling alley 500 on a Tuesday afternoon may be different than the audio properties associated with the background noise in the bowling alley 500 on a Friday night. For example, on a Tuesday afternoon, the background noise of the bowling alley 500 may have a quieter overall background noise volume level. This may allow for a meeting or conversation to occur within the bowling alley 500 and/or while bowling. The music 520 may be a classic rock radio station played at a moderate or average volume level. On a Friday night, the background noise of the bowling alley 500 may have a loud overall background noise volume level. The loud background noise volume may be due to a live band or a DJ playing at the bowling alley 500. Thus, music 520 may be very loud. The loud music 520 may deter people from hosting meetings or having conversations at the bowling alley 500 on a Friday night.

As described previously herein, the determined audio properties of the received audio input may be received at a server from a plurality of devices that have previously authorized the sharing of the determined audio properties. The user may enable or disable the receiving background noise as audio input and the determining of audio properties of the received audio input. The determined audio properties may be aggregated and used to build a model of the audio properties associated with the point of interest. The determined audio properties may be grouped based on the associated time stamp or the time the audio properties were determined. Once the model is built, subsequently received audio properties may be used to update the model. As such, when subsequent search queries are received, the information about the audio properties associated with particular points of interest may be provided to other users in response.

Figures 6A, 6B, 6C:
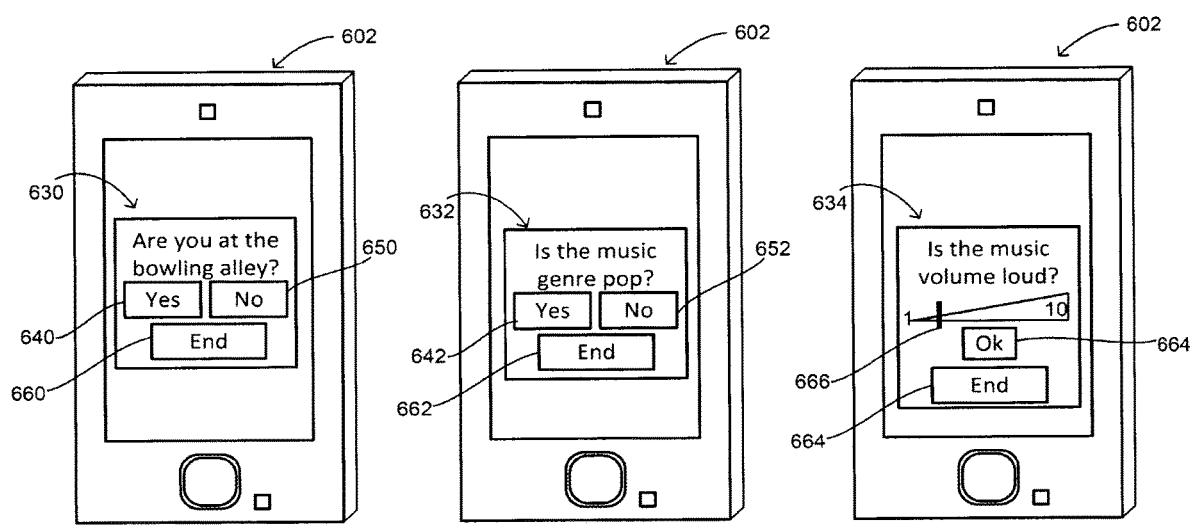
FIGS. 6A-6C are a series of example interfaces corresponding to the example use of FIG. 5.

FIGS. 6A-6C illustrate examples of questions that may be asked to verify the location information and/or audio properties of the received audio input. As described herein, the questions may ask the user to confirm the particular point of interest, the music genre, whether the music is live, the background noise volume level, the music volume level, etc. The device may determine, based on the user's engagement with the prompts, whether to ask more questions. In some examples, the device may look to a user's past cooperation and/or participation with providing feedback for other applications to determine whether to ask a series of questions verifying the audio properties.

FIGS. 6A-6C may ask verification questions regarding the audio input received while at the bowling alley as compared to FIGS. 4A-4C which may ask verification questions regarding the audio input received while at the cafe. The questions that may be asked may be based on the type of background noise detected, the volume of the background noise, whether the background noise is chatter or music, etc.

As shown in FIG. 6A, device 602 may display a first question 630 seeking feedback regarding the audio input received while at the bowling alley. The first question 630 may ask the user to verify the point of interest. For example, question 630 may ask the user to confirm whether the point of interest is a bowling alley. The user may answer question 630 with a yes 640, no 650, or end 660. This may verify the location information to be associated with the audio input. If the user selects end 660, no further questions will be asked.

FIG. 6B illustrates a second question. The second question 632 may be asked as a follow up to the first question 630 if the user answered the first question 630.

The second question 632 may ask the user to verify audio properties associated with the received audio input. Question 632 may be asked to confirm or determine the genre of music playing at the point of interest. For example, the second question 632 may ask the user whether the music playing in the background is pop music. The user may select yes 642, no 652, or end 662 in response to question 632. If the user selects no 652, subsequent questions may be asked to determine the correct genre of music. If the user selects end 662, the device may not ask additional questions.

FIG. 6C illustrates a third question that may be based on the second question 632. The third question 634 may ask about additional audio properties about the background music received as audio input. For example, the third question 634 may ask whether the music volume is loud. The user may provide a response on a sliding scale. For example, the user may adjust indicator 666 along a scale of 1 to 10, with 1 being the quietest and 10 being the loudest. In some examples, the scale may be from 1 to 5. In other examples, the sliding scale may be labeled with quiet and loud instead of numbers. Thus, the scale of 1 to 10 is just an example and is not meant to be limiting. After the user adjusts indicator 666 along the scale, the user may select "ok" 664 to confirm the answer. The user may select end 664 to have no further questions.

The answers provided by the user for questions 630, 632, 634 may be used to update the model of audio properties associated with the point of interest in real time. In some examples, the real-time audio properties associated with the point of interest may be compared to other or additional real-time audio properties collected by other users. For example, a plurality of users may be asked to confirm whether the genre of music currently playing is rock. If more than one user confirms that the genre of music is rock, the server may update the audio properties associated with the point of interest to show that rock music is known to be played at that time, day, etc. A comparison of verification answers from a plurality of users may be used as an additional verification measure. For example, the servers may receive conflicting answers to the verification questions. In such an example, a first user may answer a verification question finding the background noise level of a point of interest to be quiet while a second user may answer a verification question finding the background noise level of the same point of interest to be loud. When the server receives conflicting answers for the same point of interest, the server may not update the audio properties associated with the point of interest.

Figure 7:
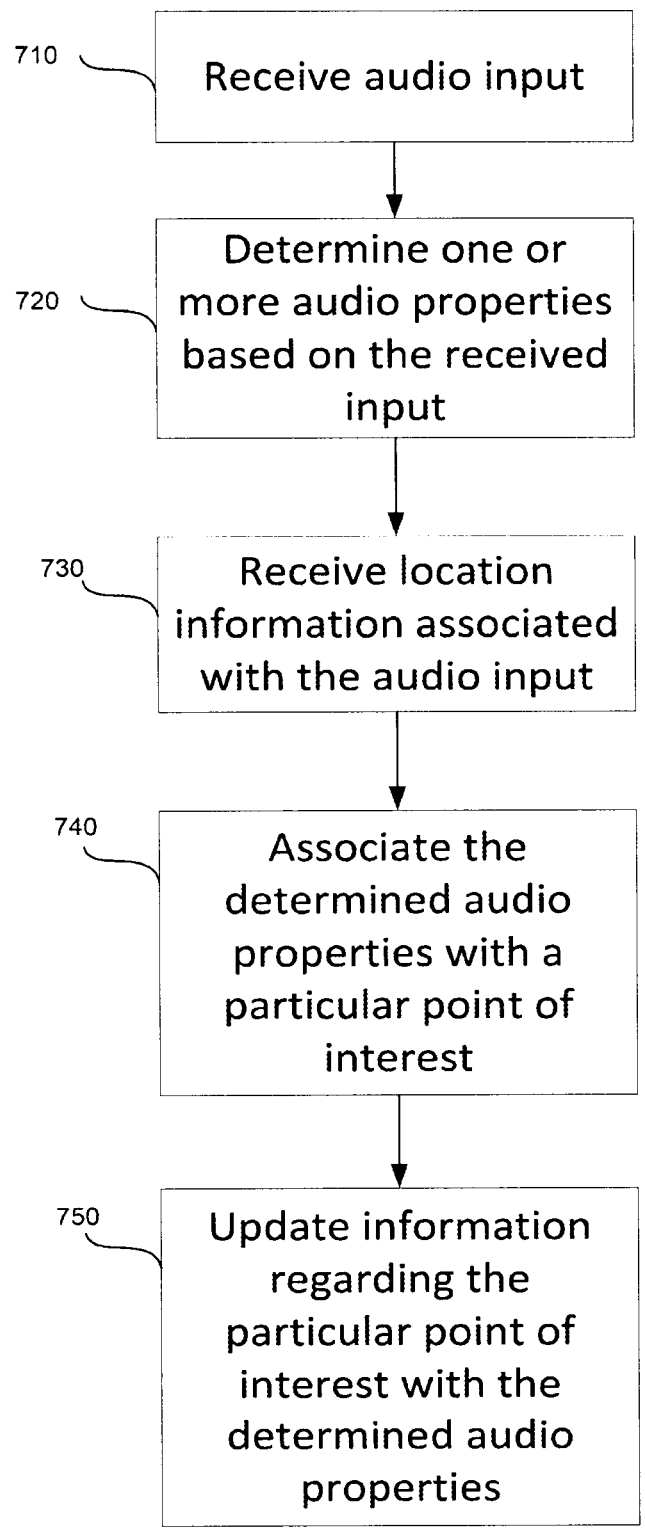
FIG. 7 is a flow diagram illustrating a method of associating audio properties with a point of interest according to aspects of the disclosure.

FIG. 7 illustrates an example method for updating information with determined audio properties associated with a particular point of interest. For example, in block 710, a device may receive audio input. The audio input may include background noise. The background noise may include conversations, street noise such as traffic or construction, music, etc.

In block 720, the device may determine one or more audio properties based on the received audio input. For example, audio properties may include the type of background noise, volume level, or other characteristics of the received audio. The type of background noise may classify the noise as music, talking, traffic, construction, or any of a variety of other types of noise. According to some examples, where the noise is music, the audio properties may further specify, a music genre, a title of a song, whether the music is recorded or there is a live band, etc. In some examples, where the noise is background chatter, the audio properties may further specify a volume level of the chatter.

In block 730, the device may receive location information associated with the audio input. For example, the device may use GPS sensors or other positioning elements to provide an indication as to the location of the device. In some examples, information from the sensors and/or from data received or determined from remote devices (e.g., wireless base stations or wireless access points), can be employed by the position determination module to calculate or otherwise estimate the physical location of device 302. Other examples of location determination systems may determine location based on images of geographic objects such as landmarks, semantic indicators such as light or noise level, etc. The location of the device may be used to determine a particular point of interest.

In block 740, the received audio input and the determined audio properties may be associated with a particular point of interest. For example, the audio input may be received at a certain geographic location at which a particular point of interest is located. The determined audio properties for the audio input may be associated with the point of interest in which the audio input was received. For example, the determined audio properties may be stored in a database along with other information pertaining to a plurality of points of interest. The other information for a particular point of interest may include, for example, business name, location, operating hours, type of establishment, menu, website, etc. The information, including the determined audio properties, may be provided in response to a search query. In some examples, the determined audio properties may be associated with certain time intervals of the operating hours, a busyness indicator, etc.

In block 750, information regarding the particular point of interest may be updated. For example, the information regarding the particular point of interest may be updated with the determined audio properties. The information may be updated in real time. In some examples, the updated information may provide information as to when the background noise level is the loudest. According to some examples, the updated information may provide information regarding what type of music is played on each day. For example, the updated information may provide a user information that on Monday country music is played, on Tuesday pop music is played, on Wednesday classic rock is played, on Thursday there is live music, etc. The updated information may allow users to identify particular points of interest based on the determined audio properties.

Figure 8:
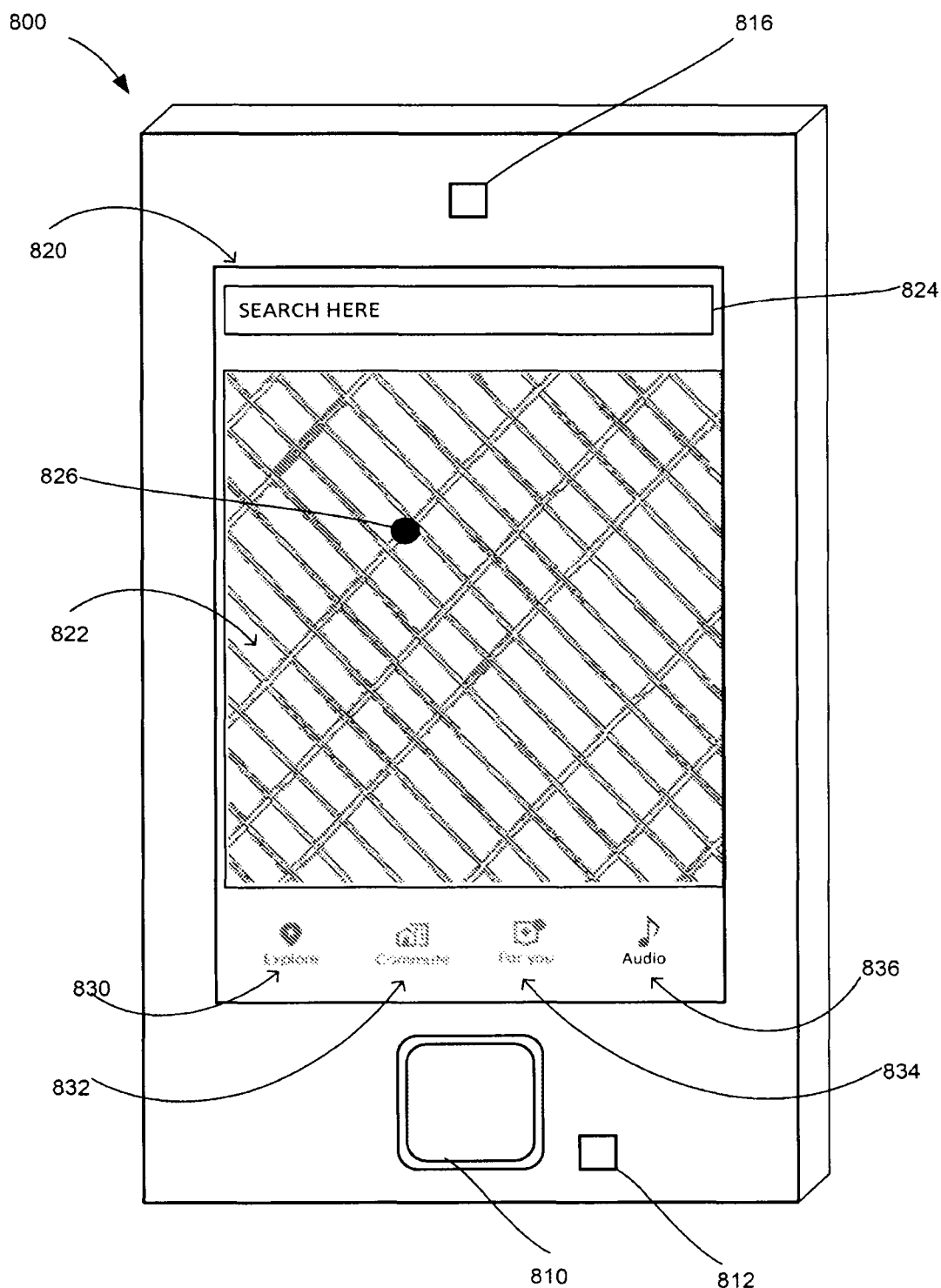
FIG. 8 is an example interface illustrating a query for a particular point of interest according to aspects of the disclosure.

Once a model of the audio properties associated with a point of interest is built, a user may search the model. FIG. 8 illustrates an example interface of a search query for finding or determining a plurality of points of interest based on audio properties associated with those points of interest. Device 800 may include a display 820, output 816, input 810 and at least one microphone 812. Display 820 may include a search bar 824 and a map section 822. Map section 822 may include a position identifier 826 showing the current location of the device 800.

Display 820 may further include a plurality of search options including "explore" 830, "commute" 832, "for you" 834, and "audio" 836. "Explore" 830 provides a plurality of suggestions based on the location indicated by position identifier 826 of the device 800 or any selected geographic location. For example, selecting "explore" 830 may provide suggestions such as cake shows, family restaurants, activities, golf courses, etc. around the location indicated by position identifier 826 of the device 800 or any other geographic location searched by the user. "Commute" 832 may check the traffic between the location 826 of the device 800 and a preset address set by the user. The preset address may be the address of the user's location of work. "For you" 834 may provide suggestions regarding points of interest around the location indicated by position identifier 826 of the device 800 that are open for business. When selecting "for you" 834, the suggestions may include restaurants, events, businesses, etc.

"Audio" 836 may allow the user to search for locations based on audio properties associated with the points of interest. The user may search based on the type of background noise, such as whether there is conversation and/or music, the volume level of the background noise, the volume level of conversation, the volume level of the music, whether there is other noise in the background such as construction or traffic noise. The user may search particular audio properties with respect to the type of background noise. For example, the user may want to find a location that will allow for conversation that can be heard over the background noise. Thus, the user may use the "audio" 836 search to find a place with quiet background noise. In some examples, the user may want to find a location that has a live band playing on a Friday night. The user may be able to refine the search to find only points of interest that have audio properties indicating that a live band plays on Friday nights.

Allowing users to search and identify points of interest based on the associated audio properties may help find a place best suited for their needs. For example, people with high frequency hearing loss may have difficulty having conversations when there is relatively high background noise level, and therefore may prefer to identify establishments with low background noise levels. Additionally, people with reduced hearing sensitivity who do not want to have a conversation may prefer establishments with higher volumes of music. As such, allowing users to identify establishments with high music volumes would benefit this category of person.

Figure 9:
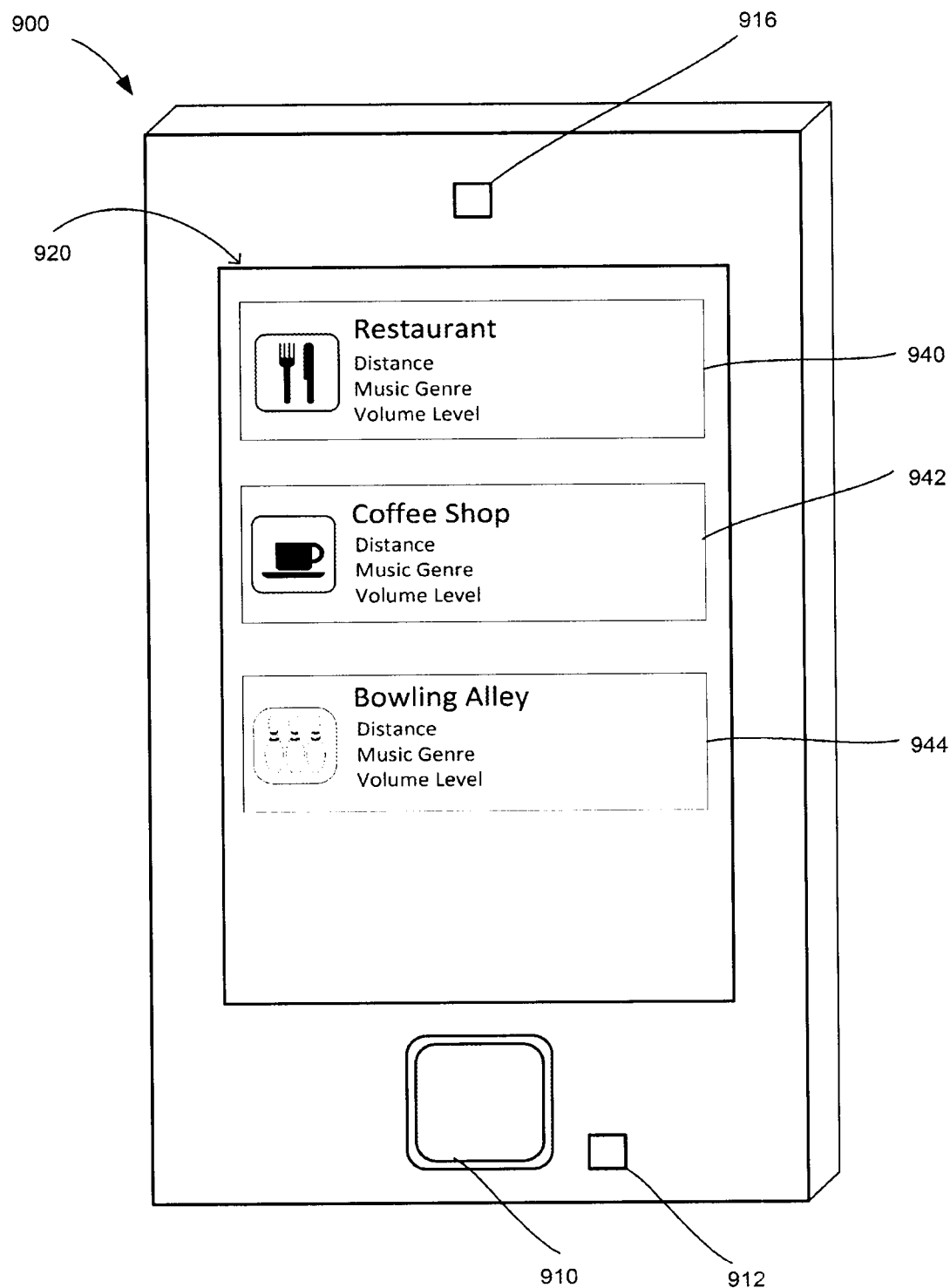
FIG. 9 is an example interface illustrating information regarding the points of interest according to aspects of the disclosure.

FIG. 9 illustrates an example of how search results based on audio properties may be displayed. Device 900 may be similar to device 800. For example, device 900 may include a display 920, output 916, input 910 and at least one microphone 912. These features may be similar to those discussed herein with respect to device 100.

The device 900 may provide search results by overlaying the information on the screen, or display 920. The information may be provided in a variety of different ways, such as a list, a map, annotations to a map, etc. The information may be ordered based on most relevant search results, distance to the user, etc. According to other examples, the information may be output as audio data through one or more speakers, or output 916, of device 900 or accessories paired with device 900.

The plurality of search results may be provided as a detailed list. Each of the points of interest may be provided as an individual place card 940, 942, 944, or button, on display 920. For example, the most relevant point of interest based on the audio properties may be a restaurant, shown as place card 940. Place card 940 may include information about the restaurant, including the distance from the determined location of device 900, the music genre, and the background noise volume level. In some examples, the interactive place card 940 may allow for quick actions relevant to the point of interest. For example, the system may be integrated with services for the points of interest to allow for quick actions. For a restaurant, the quick action may allow a user to make a reservation. The second most relevant point of interest based on audio properties may be a coffee shop, shown as place card 942. The place card 942 may indicate that the music genre that is currently playing and the volume level of the background noise based on associated audio properties. A quick action for place card 942, the coffee shop, may be to place a mobile order for coffee. For example, the quick action may allow a user to order and pay for their order without ever entering the point of interest. The third most relevant point of interest may be a bowling alley, shown as place card 944. A quick action for the bowling alley may allow a user to reserve a bowling lane.

The order of which the places of interest appear may change based on the audio properties searched by the user. The order of which the places of interest appear may be based on the distance from the location of the device or a preselected geographical location chosen by the user. In some examples, the order may also change as the system learns the choices of the users.

Figure 10:
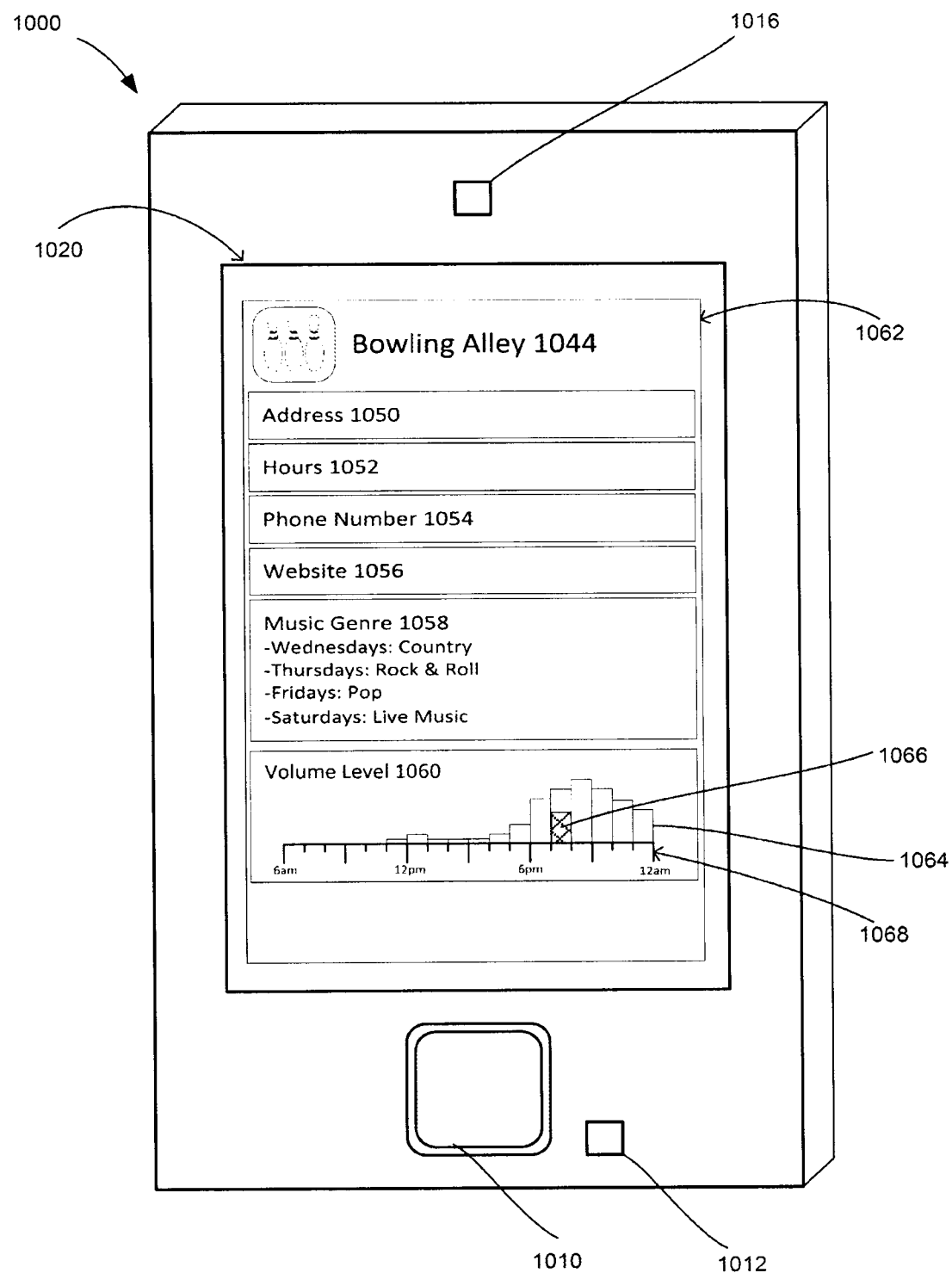
FIG. 10 is an example interface illustrating information regarding a particular point of interest according to aspects of the disclosure.

FIG. 10 illustrates an example of a display showing an expanded place card. Device 1000 may be similar to device 900. For example, device 1000 may include a display 1020, output 1016, input 1010 and at least one microphone 1012. These features may be similar to those discussed herein with respect to device 100.

Expanded place card 1062 may be displayed once a user selects a point of interest from the search results. For example, the user may select an interactive place card from the search results to find out more detailed information for that point of interest. For example, FIG. 10 illustrates an expanded place card 1062 for the bowling alley 1044. The expanded place card 1062 may include an address 1050, operating hours 1052, a phone number 1054, and a website 1056 associated with the bowling alley.

The expanded place card 1062 may further include audio properties associated with the bowling alley 1044. For example, details regarding the type of music, or music genre 1058, that is played at the point of interest may be displayed. The music genre 1058 may be broken down based on the day of the week. As shown in FIG. 10, the bowling alley 1044 may play country music on Wednesdays, rock and roll music on Thursdays, pop music on Fridays, and live music on Saturdays. The music genres 1058 may update as audio properties are collected and verified by users. For example, the music genre 1058 may change such that it lists that there is a DJ on Thursday nights instead of rock and roll music. Thus, the music genres 1058 are not static but, instead, updated in real time based on audio properties determined by user devices at that point of interest.

The expanded place card 1062 may further include a volume level section. Volume level 1060 may include an indication of how loud the background volume level is at a current time. In this example, typical volume levels are indicated by unshaded bars 1064, while the current volume level is indicated by shaded bar 1066. In this regard, the current volume is shown in relation to the typical or historical volume level, thereby providing a frame of reference. A timeline 1068 may also be provided for reference, indicating a time corresponding to each bar in the chart. Each bar may correspond to a one hour interval, or to any other interval of time. Moreover, the timeline 1068 may correspond to a range of hours that the point of interest is in operation. While the volume levels are shown as being displayed in a bar graph, it should be understood that this is merely one example. The volume levels may be provided for display in any number of ways, such as text, pictorial diagrams, charts, graphs, etc.

The volume level 1060 section of expanded place card 1062 may assist a user on determining whether the point of interest, bowling alley 1044, is appropriate for their visit. For example, people with hearing loss may want to visit during a time where the volume level is low. In some examples, if a user is seeking a place to go with a group of friends, the user may not mind if the volume level is louder.

The volume level 1060 section of expanded place card may further include a break down as to what contributes to the volume level. For example, the volume level 1060 may be made up of conversations and music. In some examples, there may be an indication of the volume level of the conversations and an indication of the volume level of the music occurring at the point of interest.

Figure 11:
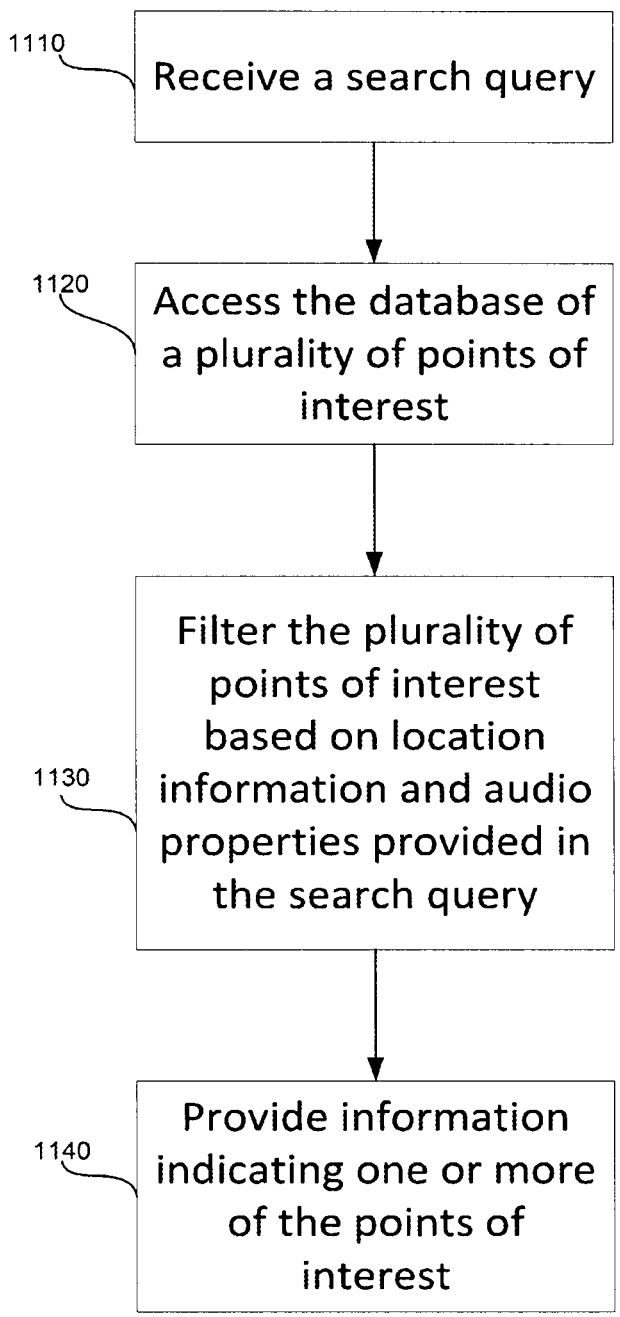
FIG. 11 is a flow diagram illustrating a method of searching for a point of interest based on audio properties according to aspects of the disclosure.

FIG. 11 illustrates an example method for accessing a database having the information pertaining to a plurality of points of interest and the associated audio properties. For example, in block 1110 the device may receive a search query. The search query may be performed by one or more processors that are part of the network 250, as described herein. The search query may be for one or more points of interest. The search query may include one or more audio properties associated with the points of interest. According to some examples, the search query may include location information. In some examples, the location information may be obtained based on the location of the device. According to some examples, the location information may be a location selected by the user. The location may be determined based on a city and state, the zip code, an address, etc. The search query may include search attributes pertaining to audio properties associated with the points of interest. For example, the search query may be for a quiet café that allows for conversation or a bar that plays country music.

In block 1120, the device and/or one or more processors that are part of the network 250 may access the database of a plurality of points of interest. The database may further include information associated with the plurality of points of interest. For example, the database may include information pertaining to the location of the points of interest, operating hours of the points of interest, the phone number of the points of interest, the website of the points of interest, the type of music such as musical genres played at the points of interest, the volume level at the points of interest, etc. According to some examples, one or more selected points of interest may be identified. The audio properties associated with the selected points of interest may correspond with the audio properties included in the search query.

In block 1130, the device and/or one or more processors that are part of the network 250 may filter through the plurality of points of interest within the database based on the location information and audio properties provided in the search query. For example, if the user searches for a quiet restaurant within a preset distance from the location of the device, the device and/or one or more processors that are part of the network 250 may filter through the database to find only restaurants that are quiet and within the preset distance. In some examples, the user may search for a place having activities for kids that plays music appropriate for children. According to some examples, the device and/or one or more processors that are part of the network 250 may filter the one or more points of interest based on location information received as part of the search query.

In block 1140, the device and/or one or more processors that are part of the network 250 may provide information indicating one or more of the points of interest that fulfill the criteria set in the search query. The information may be provided for display on the device. In some examples, the information may be provided as audio output.

As will be appreciated, the technology described herein may enable a search for points of interest based on audio properties associated with that point of interest. The audio properties may be, for example, the background noise volume, music volume, conversation volume, music genre, etc. Users with high frequency hearing loss may search for points of interest having a low or quiet background noise volume. In some examples, people with reduced hearing who are looking to hear music may search for points of interest having a loud music volume. Allowing users to identify a plurality of points of interest based on associated audio properties may benefit the user in selecting a particular point of interest best suited to their interest.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
   one or more memories storing a plurality of points of interest in association with one or more audio properties;
   one or more processors in communication with the one or more memories, the one or more processors configured to:
     receive, from at least one client computing device, a search query for one or more points of interest, the search query including one or more audio properties associated with the one or more points of interest;
     identify, in response to the search query, one or more selected points of interest stored in the one or more memories, wherein the audio properties associated with the one or more selected points of interest correspond with the one or more audio properties included in the search query;
     provide for output at least one of the selected points of interest along with the corresponding one or more audio properties; and
     provide for output at least one verification question confirming whether the at least one of the selected points of interest corresponds to the one or more audio properties.

2. The system of claim 1, wherein the one or more processors are further configured to:
   receive location information associated with the search query; and
   wherein identifying the one or more selected points of interest stored in the one or more memories further comprises filtering the one or more selected points of interest based on the received location information.

3. The system of claim 1, wherein the one or more audio properties include at least one of a music genre, a title of currently playing song, or a volume level.

4. The system of claim 3, wherein the volume level indicates a music playback volume or a background noise volume.

5. The system of claim 1, wherein the plurality of points of interest in association with one or more audio properties stored in the one or more memories are updated in real-time.

6. The system of claim 1, wherein the one or more memories comprise a mapping database including the one or more points of interest, wherein the one or more audio properties are stored in the mapping database in association with the plurality of points of interest.

7. The system of claim 1, wherein the one or more processors are further configured to:
   receive location information; and
   compare the received location information to a location of the one or more selected points of interest, wherein the at least one verification question is provided in response to a determination that the received location information corresponds to the location of the at least one selected points of interest.

8. A method comprising:
   receiving, from at least one client computing device, a search query for one or more points of interest, the search query including one or more audio properties associated with the points of interest;
   identifying, in response to the search query, one or more selected points of interest, wherein the audio properties associated with the one or more selected points of interest correspond with the one or more audio properties included in the search query;
   providing for output at least one of the selected points of interest along with the corresponding one or more audio properties; and
   providing for output at least one verification question confirming whether the at least one of the selected points of interest corresponds to the one or more audio properties.

9. The method of claim 8, further comprising:
   receiving location information associated with the search query; and
   wherein identifying the one or more selected points of interest further comprises filtering, based on the received location information, the one or more selected points of interest.

10. The method of claim 8, wherein the one or more audio properties includes at least one of a music genre, a title of a currently playing song, or a volume level.

11. The method of claim 10, wherein the volume level indicates a music playback volume or a background noise volume.

12. The method of claim 8, further comprising updating, in real-time, the plurality of points of interest in association with the one or more audio properties.

13. The method of claim 8, further comprising storing the one or more audio properties in association with the plurality of points of interest in a mapping database.

14. The method of claim 8, wherein providing for output at least one of the selected points of interest further comprises indicating at least one of a music genre and a volume level.

15. A non-transitory computer readable storage medium storing instructions executable by a processor for performing a method comprising:
   receiving, from at least one client computing device, a search query for one or more points of interest, the search query including one or more audio properties associated with the one or more points of interest;
   identifying, by one or more processors in response to the search query, one or more selected points of interest, wherein the audio properties associated with the one or more selected points of interest correspond with the one or more audio properties included in the search query;
   providing, by the one or more processors, for output at least one of the selected points of interest along with the corresponding one or more audio properties; and
   providing, by the one or more processors, for output at least one verification question confirming whether the at least one of the selected points of interest corresponds to the one or more audio properties.

16. The non-transitory computer readable medium of claim 15, further comprising:
   receiving, by the one or more processors, location information associated with the search query; and
   wherein identifying the one or more selected points of interest responsive to the search query further comprises filtering, by the one or more processors based on the received location information, the one or more selected points of interest.

17. The non-transitory computer readable medium of claim 15, wherein the one or more audio properties includes at least one of a music genre, a title of a currently playing song, or a volume level.

18. The non-transitory computer readable medium of claim 17, wherein the volume level indicates a music playback volume or a background noise volume.

19. The non-transitory computer readable medium of claim 15, further comprising updating, by the one or more processors, in real-time the plurality of points of interest in association with the one or more audio properties.

20. The non-transitory computer readable medium of claim 15, further comprising storing the one or more audio properties in association with the plurality of points of interest in a mapping database.

* * * * *